US012555949B2

(12) United States Patent
Ilie et al.

(10) Patent No.: US 12,555,949 B2
(45) Date of Patent: Feb. 17, 2026

(54) ELECTRICAL CONNECTOR COMPRISING TWO SLEEVES DEFINING A CLOSED EQUIPOTENTIAL CAVITY AROUND A CONTACT ZONE

(71) Applicants: ULTRATECH, Le Chesnay (FR); EPROM, Poissy (FR)

(72) Inventors: Razvan Ilie, Rocquencourt (FR); Michel Ramez, Poissy (FR)

(73) Assignees: ULTRATECH, Le Chesnay (FR); EPROM, Poissy (FR)

( * ) Notice: Subject to any disclaimer, the term of this patent is extended or adjusted under 35 U.S.C. 154(b) by 364 days.

(21) Appl. No.: 18/455,333

(22) Filed: Aug. 24, 2023

(65) Prior Publication Data

US 2024/0072486 A1 Feb. 29, 2024

(30) Foreign Application Priority Data

Aug. 26, 2022 (FR) ...................................... 2208570

(51) Int. Cl.
*H01R 13/53* (2006.01)
*H01R 13/50* (2006.01)
(Continued)

(52) U.S. Cl.
CPC ............. *H01R 13/53* (2013.01); *H01R 13/50* (2013.01); *H01R 13/6581* (2013.01); *H01R 13/6592* (2013.01); *H01R 2201/26* (2013.01)

(58) Field of Classification Search
CPC .... H01R 13/53; H01R 13/50; H01R 13/6581; H01R 13/6592; H01R 2201/26
(Continued)

(56) References Cited

U.S. PATENT DOCUMENTS 5,846,093 A * 12/1998 Muench, Jr. ........... H01R 13/53 439/89
8,460,022 B2 * 6/2013 Nguyen ................. H01R 43/18 439/181

(Continued)

FOREIGN PATENT DOCUMENTS

CN 215989507 U 3/2022
DE 102019209235 A1 12/2020

(Continued)

OTHER PUBLICATIONS

French Search Report for FR2208570 dated Apr. 26, 2023, 2 pages.

*Primary Examiner* — Gary F Paumen
(74) *Attorney, Agent, or Firm* — NIXON & VANDERHYE

(57) ABSTRACT

Disclosed is an electrical connector including: a first contact, and a second contact; a first sleeve and a second sleeve forming a box in a connected configuration of the connector around a contact zone; the first sleeve including a first radially outer wall for electrically connecting to a shielding braid of the first electrical cable, and a first radially inner wall electrically connected to the first contact, and a first electrically insulating medium; the second sleeve including a second radially outer wall, a second radially inner wall, and a second electrically insulating medium; the first radially outer wall and the second radially outer wall form, in the connected configuration, a continuous outer surface of the housing, the first radially inner wall and the second radially inner wall forming a continuous inner surface.

9 Claims, 1 Drawing Sheet

(51) Int. Cl.
*H01R 13/6581* (2011.01)
*H01R 13/6592* (2011.01)

(58) Field of Classification Search
USPC ................................ 439/587, 578, 181, 186
See application file for complete search history.

(56) References Cited

U.S. PATENT DOCUMENTS

| | | | | |
|---|---|---|---|---|
| 2010/0200265 | A1* | 8/2010 | Lu | H01R 13/53 174/73.1 |
| 2016/0240979 | A1* | 8/2016 | Joo | H01R 13/53 |
| 2022/0368065 | A1* | 11/2022 | Wittmann | H01R 13/641 |

FOREIGN PATENT DOCUMENTS

| | | | | |
|---|---|---|---|---|
| DE | 102019209436 | A1 | 12/2020 | |
| WO | WO-2015075112 | A1 * | 5/2015 | H01R 13/53 |

* cited by examiner

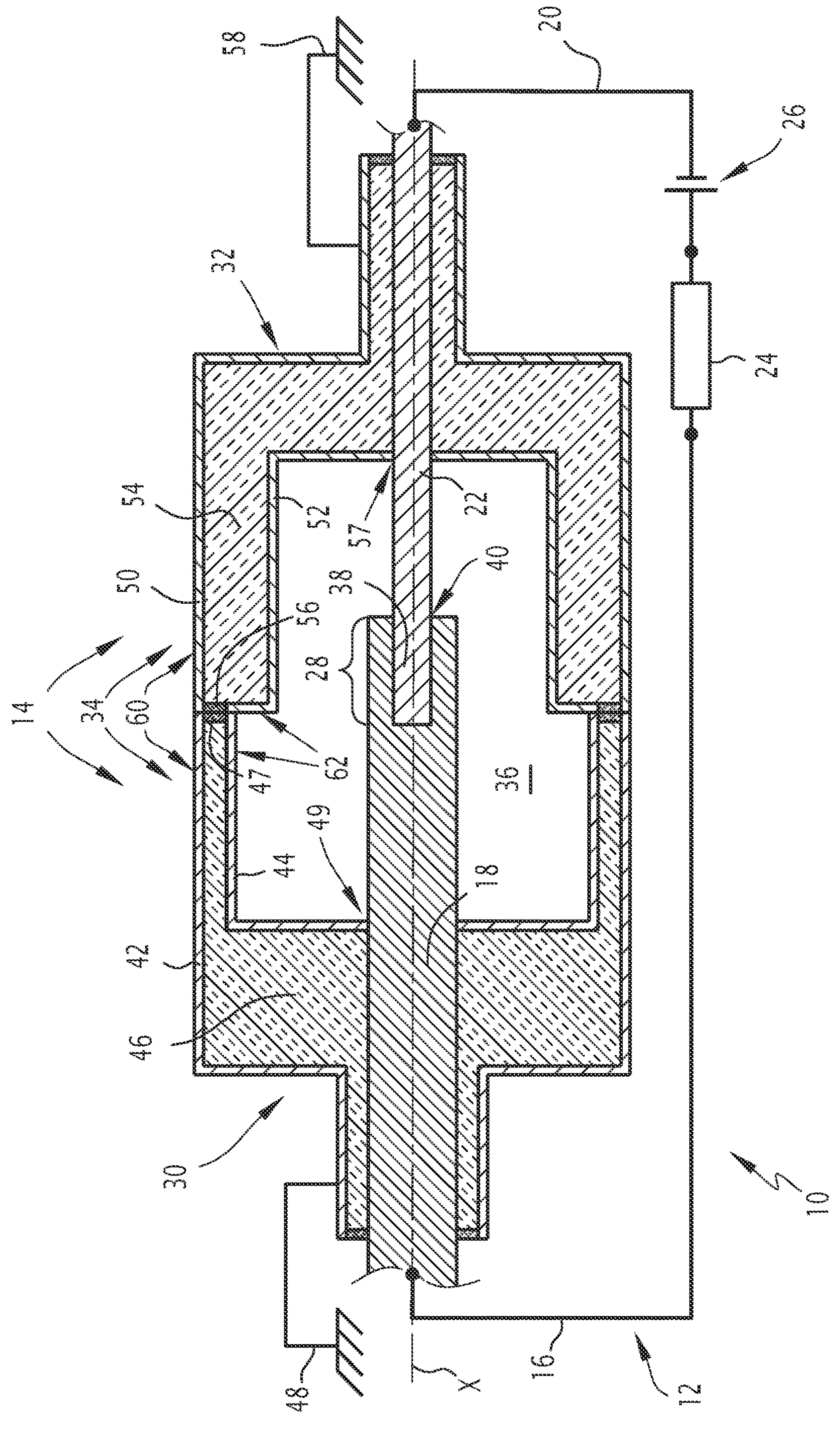
58
20
26
32
24
54
52
57
22
50
56
38
40
14
34
60
28
62
47
36
49
44
18
42
46
30
10
48
X
16
12

ELECTRICAL CONNECTOR COMPRISING TWO SLEEVES DEFINING A CLOSED EQUIPOTENTIAL CAVITY AROUND A CONTACT ZONE

CROSS-REFERENCE TO RELATED APPLICATIONS

This application claims the priority under 35 USC 119(a) of French patent application FR 22 08570 filed on Aug. 26, 2022, the entirety of which is incorporated herein by reference.

BACKGROUND OF THE INVENTION

Field of the Invention

The present invention relates to an electrical connector comprising:

- a first contact and a second contact, the connector being movable along a connection axis between a connected configuration, wherein the first contact and the second contact are in electrical contact with each other and define a contact zone, and a disconnected configuration, wherein the first contact is distant from the second contact, and
- a first sleeve and a second sleeve attached to and surrounding the first contact and the second contact, the first sleeve and the second sleeve respectively forming a box in the connected configuration.

The invention further relates to an electrical installation comprising at least one such electrical connector.

Description of the Related Art

Different components and sources of electrical energy are fitted with connectors, e.g. batteries, fuel cell turbogenerators, AC/DC converters, electric motors, actuators, cables, wiring and various on-board electrical devices or systems.

The operational context of electrical connections taken on-board a vehicle is evolving by the emergence of new mobilities guided by the improvement of energy storage systems in electrical form, and by the general need to make vehicles more environmentally friendly.

Thereby, electrical distribution systems should be reliable and safe at the voltages required for a hybrid-electric architecture under typical conditions of operation, with differences of potential of 800 V or even more, while meeting the requirements of maximum efficiency of on-board systems, of maintainability and of durability, with a minimized mass, so as to reduce CO2 emissions.

Given the voltages involved, there is a risk of electrocution for the users of the connectors. Furthermore, it is desired to be able to detect partial discharges and creeping arcs, and to eliminate the possibility of partial discharges at the source.

At present, in order to integrate such requirements or wishes, the distances in the electrical connectors are increased, which results in larger boxes, hence problems of space caused by the electrical connector and of contribution to the weight of devices, in particular of vehicles.

A goal of the invention is thus to provide an electrical connector suitable for differences of potential on the order of 500 to 800 V, or even more, having good safety and better compactness.

SUMMARY OF THE INVENTION

To this end, the subject matter of the invention is an electrical connector comprising:

- a first contact intended for being connected to a first electrical cable, and a second contact intended for being connected to a second electrical cable, the connector being movable along a connection axis between a connected configuration, wherein the first contact and the second contact are in electrical contact with each other and define a contact zone, and a disconnected configuration, wherein the first contact is distant from the second contact, and
- a first sleeve and a second sleeve attached to and surrounding the first contact and the second contact, respectively, the first sleeve and the second sleeve forming a box in the connected configuration, the box defining a cavity around the contact zone, the first sleeve comprising:

- a first radially outer wall with respect to the connection axis, and a first radially inner wall, the first radially outer wall being electrically conductive and intended for being electrically connected to a shielding braid of the first electrical cable, the first radially inner wall being electrically conductive and electrically connected to the first contact, and
- a first electrically insulating medium extending between, on the one hand, the first radially outer wall and, on the other hand, the first contact and the first radially inner wall, the second sleeve comprising:

- a second radially outer wall and a second radially inner wall, the second radially outer wall being electrically conductive and intended for being electrically connected to a shielding braid of the second electrical cable, the second radially inner wall being electrically conductive and electrically connected to the second contact, and
- a second electrically insulating medium extending between, on the one hand, the second radially outer wall and, on the other hand, the second contact and the second radially inner wall, the first radially outer wall and the second radially outer wall being, in the connected configuration, in electrical contact with each other and forming a continuous outer surface of the box, the first radially inner wall and the second radially inner wall are, in the connected configuration, in electrical contact with each other and form a continuous inner surface.

According to particular embodiments, the electrical connector has one or a plurality of the following features, taken individually or according to all technically possible combinations:

- the first radially outer wall, the first radially inner wall, the second radially outer wall, the second radially inner wall comprise a layer of nickel;
- the first electrically insulating medium and the second electrically insulating medium comprise a polymeric material;
- the first contact and the second contact are exposed in the cavity formed in the connected configuration;
- the first sleeve comprises a first electrically insulating seal extending radially between the first radially outer wall and the first radially inner wall, on the first electrically insulating medium; and the second sleeve comprises a second electrically insulating seal extending radially between the second radially outer wall and the second radially inner wall, on the second electrically insulating medium, the first seal and the second seal being in mechanical contact with each other in the connected configuration;

the first seal and the second seal are made of silicone; and the silicone is fluorinated.

A further subject matter of the invention is an electrical installation comprising:

at least one electrical connector, and at least one electrical circuit comprising a first electrical cable electrically connected to the first contact and a second electrical cable electrically connected to the second contact, the first electrical cable being at a first potential and the second electrical cable being at a second potential, the electrical circuit being configured in such a way that the difference between the potential of the first electrical cable and the potential of the second electrical cable is greater than 500 V in absolute value when the electrical connector is in the disconnected configuration.

According to a particular embodiment, the electrical circuit comprises at least one device consuming electrical energy, the device being intended for consuming an electrical power greater than 500 kW.

BRIEF DESCRIPTION OF THE SEVERAL VIEWS OF THE DRAWING(S)

The invention will be better understood upon reading the following description, given only as an example and making reference to the enclosed drawing, wherein FIG. 1 is a schematic representation of an electrical installation according to the invention.

DETAILED DESCRIPTION OF THE INVENTION

With reference to FIG. 1, an electrical installation 10 according to described, is described.

The electrical installation 10 is e.g. located in an electric or hybrid vehicle (not shown), e.g. a motor vehicle, a train or an aircraft.

The installation 10 comprises an electrical circuit 12 and at least one electrical connector 14.

The electrical circuit 12 comprises a first electrical cable 16 at a first electrical potential and electrically connected to a first contact 18 of the electrical connector 10, and a second electrical cable 20 at a second electrical potential and electrically connected to a second contact 22 of the electrical connector.

The electrical circuit 12 is e.g. configured so that the difference of potential between the first electrical cable 16 and the second electrical cable 20 is greater than 500 V in absolute value when the electrical connector 14 is in a disconnected configuration, wherein the first contact 18 is distant from the second contact 22.

The electrical circuit 12 advantageously comprises at least one device 24 consuming electrical energy, intended for consuming an electrical power greater than 500 kW. The electrical circuit 12 comprises e.g. a source of electrical energy 26, such as a battery or a fuel cell.

The source of electrical power 26, the device 24 and the electrical connector 14 are e.g. mounted in series with one another.

The electrical connector 14 is movable along a connection axis X between a connected configuration (shown in FIG. 1), wherein the first contact 18 and the second contact 22 are in electrical contact with each other and define a contact zone 28, and the disconnected configuration (not shown, but which can be deduced from the connected configuration by separating the first contact 18 and the second contact 22 from each other along the connection axis X).

In addition to the first contact 18 and the second contact 22, the electrical connector 14 comprises a first sleeve 30 and a second sleeve 32 attached to and surrounding the first contact 18 and the second contact 22, respectively, about the connection axis X, the first sleeve and the second sleeve forming a box 34 in the connected configuration, the box defining a cavity 36 around the contact zone 28.

The first contact 18 and the second contact 22 are e.g. made of copper or aluminum or alloys including said metals. In the example, the first contact 18 and the second contact 22 are e.g. exposed in the cavity 36.

In a variant (not shown), the first contact 18 and/or the second contact 22 is or are covered with an electrically conductive layer, e.g. obtained by metallizing, e.g. made of nickel.

The second contact 22 is e.g. a male contact, at least a portion 38 of which is suitable for being received in a housing 40 defined by the first contact 18, which thus forms a female contact.

For example, the first contact 18 includes blades (not shown) extending axially, radially flexible and radially delimiting the housing 40.

If the first contact 18 and the second contact 22 are single (single connector), the casing 34 advantageously has a shape of revolution about the connection axis X.

“Conductor” as defined by the present application means a material the electrical resistivity of which at 300 K is e.g. less than or equal to 10-5 Ω·m. The term “insulator” means a material the electrical resistivity of which at 300 K is, e.g. greater than or equal to 105 Ω·m.

The first sleeve 30 comprises a first radially outer wall 42 with respect to the connection axis X, a first radially inner wall 44, and a first electrically insulating medium 46 extending between, on the one hand, the first radially outer wall 42 and, on the other hand, the first contact 18 and the first radially inner wall 44. Advantageously, the first sleeve 30 further comprises a first electrically insulating seal 47 extending radially between the first radially outer wall 42 and the first radially inner wall 44, on the first electrically insulating medium 46.

The first radially outer wall 42 is electrically conductive and electrically connected to a shielding braid 48 (symbolized by an electrical ground in FIG. 1) of the first electrical cable 16. The first radially outer wall 42 is thus electrically insulated from the first contact 18.

The first radially inner wall 44 is electrically conductive and electrically connected to the first contact 18. For example, the first radially inner wall 44 defines an orifice 49 letting through the first contact 18 without any clearance.

According to a variant, the first radially inner wall 44 is attached to the first contact 18, advantageously by continuity of material, by welding, or by any conductive interface (not shown) making the electrical continuity possible between the first contact 18 and the radially inner wall 44, e.g. by a conductive seal or any other mechanical connection (contact strip, claws, etc.) which does not influence the operation of the connector 14.

The first radially outer surface 42 and the first radially inner surface 44 comprise e.g. a layer of nickel, advantageously obtained by metallizing the first electrically insulating medium 46.

The first electrically insulating medium 46 is e.g. made of a polymer material.

The polymer material is e.g. silicone, advantageously fluorinated.

The second sleeve 32 is advantageously structurally similar to the first sleeve 30, so the second sleeve will not be described in as much detail.

The second sleeve 32 comprises a second radially outer wall 50, a second radially inner wall 52, and a second electrically insulating medium 44 extending between, on the one hand, the first radially outer wall 50 and, on the other hand, the second contact 22 and the second radially inner wall 52. Advantageously, the second sleeve 32 also comprises a second electrically insulating seal 56.

The second radially outer wall 50 is electrically conductive and electrically connected to a shielding braid 58 (symbolized by an electrical ground in FIG. 1) of the second electrical cable 20.

The second radially inner wall 52 is electrically conductive and electrically connected to the second contact 22. For example, the second radially inner wall 52 defines an orifice 57 letting through the second contact 22 without any clearance.

The first radially outer wall 42 and the second radially outer wall 50 are, in the connected configuration, in electrical contact with each other and define a continuous outer surface 60 of the box 34.

Herein, "continuous" means that the first radially outer wall 42 and the second radially outer wall 50 together form an envelope of the box 34 without any orifice other than the orifices letting through, on the one hand, the first contact 18 or the first electrical cable 16, and, on the other hand, the second contact 22 or the second electrical cable 20. Thereby, the creation of partial discharges and the passage of electric arcs are prevented when the connector 14 is in operation.

In the same way, the first radially inner wall 44 and the second radially inner wall 52 are, in the connected configuration, in electrical contact with each other and define a continuous inner surface 62 of the box 34.

Herein, "continuous" means that the first radially inner wall 44 and the second radially inner wall 52 together form an envelope delimiting the cavity 36 without any orifice except the orifices 49 and 57 letting through the first contact 18 and the second contact 22.

The first seal 47 and the second seal 56 are in mechanical contact with each other in the connected configuration.

The operation of the electrical installation 10 follows from the structure thereof and will now be briefly described.

In the disconnected configuration, the electrical circuit 12 is open. The source of electrical energy 26 does not deliver electricity into the device 24.

The difference of potential between the first contact 18 and the second contact 22, and thus between the first radially inner wall 44 and the second radially inner wall 52, is e.g. greater than 500 V.

The first radially outer wall 42 and the second radially outer wall 50 are electrically insulated from the first contact 18 and the second contact 22 by the electrically insulating media 46, 54, and in the example, by the seals 47, 56

The first radially outer wall 42 and the second radially outer wall 50 are at the potentials of the shielding braids 48, 58, and thus advantageously connected to electrical chassis grounds, which protects a possible user.

The electrical connector 14 is then placed in the connected configuration (FIG. 1). The electric power source 26 supplies the device 24 with electricity. The first contact 18, the second contact 22, the first radially inner wall 44 and the second radially inner wall 52 are at the same potential P1.

The internal surface 62 forms a Faraday cage around the contact zone 28, which protects against the formation of partial discharges and the formation of electric arcs creeping into the cavity 36, since the contact zone 28 is surrounded by the internal surface 62, both being at the same electrical potential.

The first radially outer wall 42 and the second radially outer wall 50 are at the same potential P2, advantageously the potential of the shielding braids 48, 58.

Due to the features described hereinabove, the risk of ionization of the air in the cavity 36 is reduced in the connected configuration, as well as the risk of partial discharge. The electrical connector 14 is advantageously suitable for differences of potential on the order of 500 to 800 V, or even more, and has good safety and better compactness, because the box 34 is less distant from the contact zone 28 than in the prior art.

The electrical connector 14 occupies a line (first cable 16 and second cable 20) delivering e.g. between 500 kW and 1 MW of electrical power, and advantageously satisfies the standards generally used in the field of aeronautics, space and defense, e.g. the standard DO-160 G "environmental conditions and test procedures for airborne equipment" which was prepared by the Special Committee 135 (SC-135) and approved by the RTCA Program Management Committee. Said document is also referenced as EUROCAE ED-14G, or the CS 25 standard "Certification specification for large airplanes" in a version in force compared to amendment 3 of 19 Sep. 2007.

The electrical connector 14 is particularly suitable for electric or hybrid vehicles, including aircraft.

The invention claimed is:

1. An electrical connector comprising:

a first contact intended for being connected to a first electrical cable, and a second contact intended for being connected to a second electrical cable, the connector being movable along a connection axis between a connected configuration, wherein the first contact and the second contact are in electrical contact with each other and define a contact zone, and a disconnected configuration wherein the first contact is distant from the second contact, and a first sleeve and a second sleeve attached to and surrounding the first contact and the second contact, respectively, the first sleeve and the second sleeve forming a box in the connected configuration, the box defining a cavity around the contact zone, the first sleeve comprising:

a first radially outer wall with respect to the connection axis, and a first radially inner wall, the first radially outer wall being electrically conductive and intended for being electrically connected to a shielding braid of the first electrical cable, the first radially inner wall being electrically conductive and electrically connected to the first contact, and a first electrically insulating medium extending between, on the one hand, the first radially outer wall and, on the other hand, the first contact and the first radially inner wall, the second sleeve comprising:

a second radially outer wall and a second radially inner wall, the second radially outer wall being electrically conductive and intended for being electrically connected to a shielding braid of the second electrical cable, the second radially inner wall being electrically conductive and electrically connected to the second contact, and a second electrically insulating medium extending between, on the one hand, the second radially outer wall and, on the other hand, the second contact and the second radially inner wall, the first radially outer wall and the second radially outer wall being, in the connected configuration, in electrical contact with each other and forming a continuous outer surface of the box, the first radially inner wall and the second radially inner wall in the connected configuration being in electrical contact with each other and forming a continuous inner surface.

2. The electrical connector according to claim 1, wherein the first radially outer wall, the first radially inner wall, the second radially outer wall, the second radially inner wall comprise a layer of nickel.

3. The electrical connector according to claim 1, wherein the first electrically insulating medium and the second electrically insulating medium comprise a polymeric material.

4. The electrical connector according to claim 1, wherein the first contact and the second contact are exposed in the cavity formed in the connected configuration.

5. The electrical connector according to claim 1, wherein:

the first sleeve comprises a first electrically insulating seal extending radially between the first radially outer wall and the first radially inner wall, on the first electrically insulating medium, and the second sleeve comprises a second electrically insulating seal extending radially between the second radially outer wall and the second radially inner wall, on the second electrically insulating medium, the first seal and the second seal being in mechanical contact with each other in the connected configuration.

6. The electrical connector according to claim 5, wherein the first seal and the second seal are made of silicone.

7. The electrical connector according to claim 6, wherein the silicone is fluorinated.

8. An electric installation comprising:

at least one electrical connector according to claim 1, and at least one electrical circuit comprising a first electrical cable electrically connected to the first contact and a second electrical cable electrically connected to the second contact, the first electrical cable being at a first potential and the second electrical cable being at a second potential, the electrical circuit being configured in such way that the difference between the potential of the first electrical cable and the potential of the second electrical cable is greater than 500 V in absolute value when the electrical connector is in the disconnected configuration.

9. The electrical installation according to claim 8, wherein the electrical circuit comprises at least one device consuming electrical energy, the device being intended for consuming an electrical power greater than 500 kW.

* * * * *